United States Patent

Hujik

[15] 3,682,579
[45] Aug. 8, 1972

[54] APPARATUS FOR INJECTION MOLDING OF PLASTIC FOOTWEAR ARTICLES

[72] Inventor: Ladislav Hujik, Batawa, Ontario, Canada

[73] Assignee: Bata Shoe Company, Inc., Belcamp, Md.

[22] Filed: Dec. 3, 1968

[21] Appl. No.: 780,746

[30] Foreign Application Priority Data

Dec. 5, 1967 Canada..........................6,796
June 3, 1968 Canada........................21,616

[52] U.S. Cl. .................425/129, 425/420, 425/242, 425/192
[51] Int. Cl. ..........................B29g 3/00, B29f 1/12
[58] Field of Search ....18/30 US, 30 UG, 34 S, 42 H, 18/30 RC, 30 RH, 30 RM, 30 RP, 30 RU, DIG. 62, 42 D, 42 M; 264/244

[56] References Cited

UNITED STATES PATENTS

| | | | |
|---|---|---|---|
| 2,994,920 | 8/1961 | Patera | 264/244 X |
| 3,051,995 | 9/1962 | Ferrell | 18/42 H |
| 3,109,200 | 11/1963 | Ludwig | 18/30 US |
| 3,305,895 | 2/1967 | Ludwig | 18/34 S |
| 3,319,301 | 5/1967 | Ludwig | 18/42 H |
| 3,376,608 | 4/1968 | Wilcox | 18/30 US X |
| 3,484,901 | 12/1969 | Anderson | 18/30 US |
| 3,160,921 | 12/1964 | Ludwig | 18/42 H |
| 3,315,317 | 4/1967 | Winkler | 18/42 H |
| 3,371,385 | 3/1968 | Cordio et al. | 18/30 US |

FOREIGN PATENTS OR APPLICATIONS

| | | | |
|---|---|---|---|
| 1,086,363 | 10/1967 | Great Britain | 18/34 S |

*Primary Examiner*—J. Spencer Overholser
*Assistant Examiner*—B. D. Tobor
*Attorney*—Holman & Stern

[57] ABSTRACT

The molding of plastic articles particularly footwear in which two mold components are capable of being closed along a parting or separating line to provide at least in part a molding cavity and which components include recesses for constituting a supply duct for the cavity when the components are closed and at least one injection port leading from one of the recesses into the cavity at a location other than the parting or separating line.

20 Claims, 28 Drawing Figures

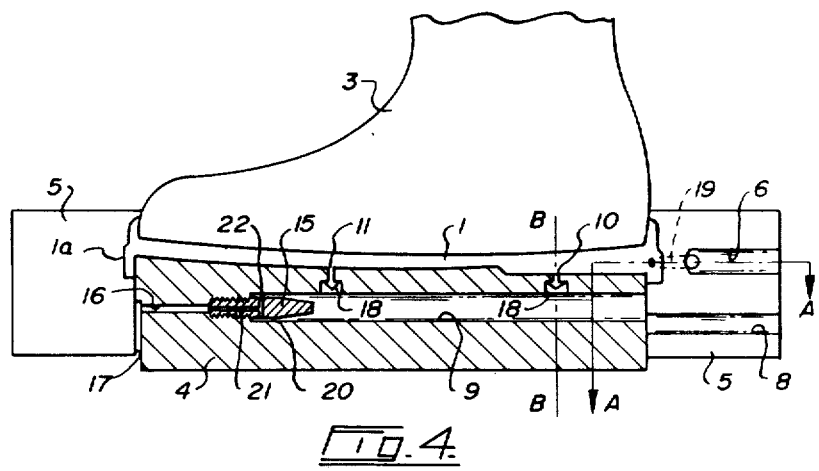
Fig. 4.
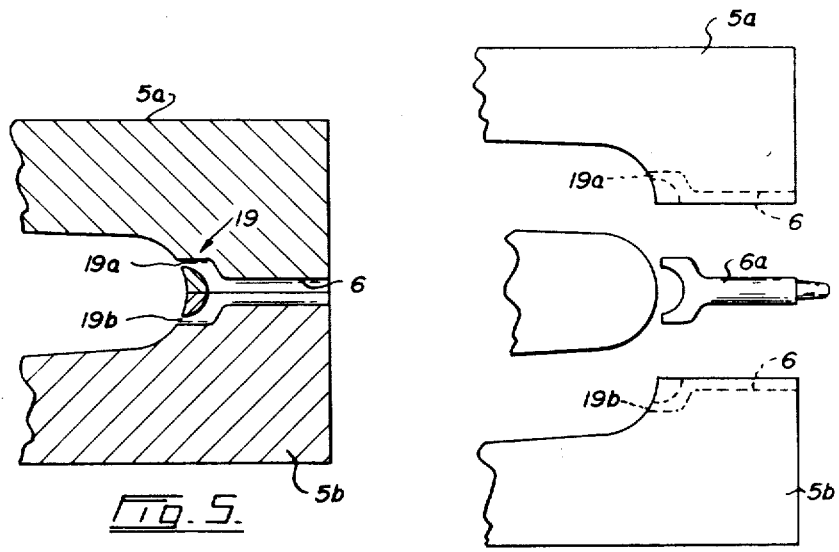
Fig. 5.
Fig. 6.
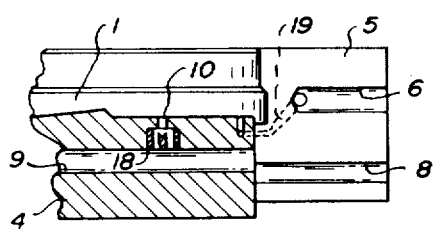
Fig. 7.

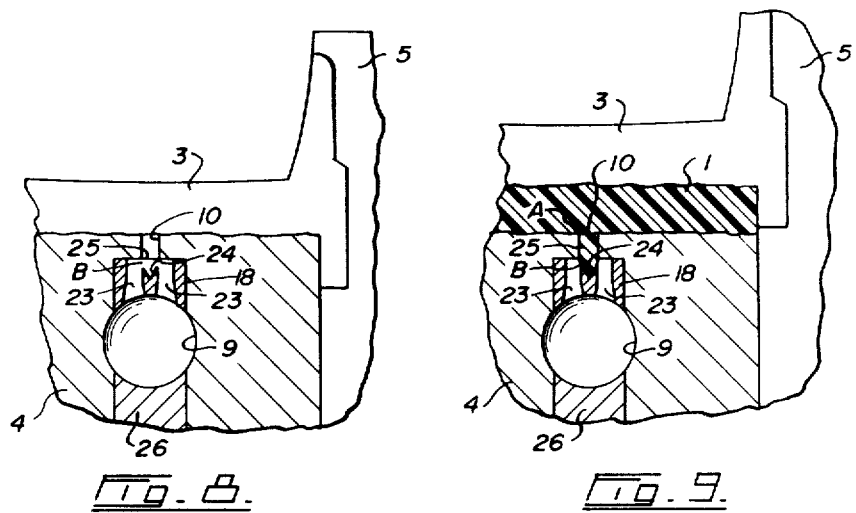
FIG. 8.  FIG. 9.
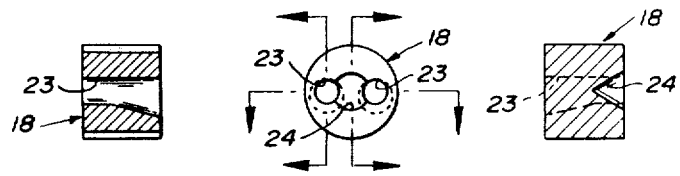
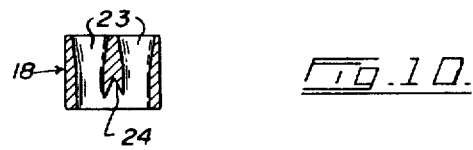
FIG. 10.
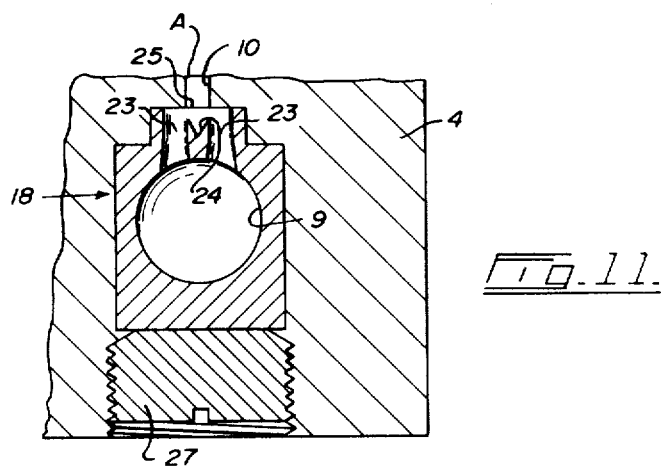
FIG. 11.

3,682,579

APPARATUS FOR INJECTION MOLDING OF PLASTIC FOOTWEAR ARTICLES

BACKGROUND OF THE INVENTION

This invention relates to a method of and an apparatus for the injection molding of articles of plastic, and more especially footwear.

More particularly, the invention relates to improvements in sole molding apparatus of the type in which provision is made for the injection molding of soles or parts thereof of different types and/or different colored plastic materials to shoe uppers.

In a known apparatus for the injection molding of multipart soles formed of different plastic materials and/or different colored plastic materials, there is provided a plurality of shoe molds mounted on a carrier or turret and adapted to be moved sucessively to one or more mold charging stations. In this apparatus, each mold has a last for receiving a shoe upper, a pair of side mold members and a sole plate member vertically movable relative to the bottom of an upper supported by the last, with the side mold members and sole plate member being adapted to close upon the last to provide a mold cavity having the shape of a sole and heel unit to be molded and attached to the bottom of a lasted shoe upper. The last may be a permanent feature of the mold or be a so-called "loose last," i.e., be in the form of a detachable last for each upper.

In this known apparatus, one or more injection passages are formed in the side mold members and are adapted to be aligned with one or more passages extending longitudinally of the sole plate to conduct the plastic bottom-forming compound to the mold cavity to form a multipart sole. By adjustment of the vertical position of the sole plate relative to the bottom of the upper supported on the last, it is possible to vary the depth of the mold cavity and to inject bottom-forming compositions of one type or color to one part of the mold cavity exclusively of another part of the cavity.

In one apparatus of this type employed heretofore four such molds are provided with each mold moving successively to four different positions at which various operations are performed. In this particular apparatus, plastic materials of two different colors are employed and these are injected through a common injection sprue hole in the sole plate. In one typical sequence for this machine, at the first position, a new shoe upper is lasted by the main operator. At the second position, which is a first color injection station, the first color is injected into the mold. At the third position, a second operator removes the sprue of first color material from the injection passages and the mold then moves to the fourth position at which a second color plastic is injected. Upon returning to the first position, the main operator must remove the sprues of material remaining in the injection passages, unlast the shoe and last a new upper after which the cycle is repeated.

As will be appreciated with this arrangement, two operators are required with the second operator stationed at the third position for the sole purpose of removing the first color sprue from the injection passages in the sole plate prior to the injection of the second color. Furthermore, since the first color sprue can be removed only when it has cooled sufficiently so that it will not tear off in the injection passages within the sole plate leaving part of the sprue in the injection passages thus blocking it for the second color injection, the cycle time and output of the machine are governed in part by the time required for a proper cooling of the sprue of the first color material before its removal.

In practical operation, the known apparatus has thus been found to have certain disadvantages which operate against the achievement of maximum efficiency and economic operation.

Another form of apparatus uses separate injection channels for two different colors of components, and will be described in some detail below. Usually it has one injection channel (or set of channels) in the mold side halves and a second channel (or set) in the sole plate of the mold.

Perhaps the most important problem encountered with this form of apparatus results from the fact that during injection of the first type or color of plastic material into the mold cavity, this enters into the injection ports and passages formed in the sole plate for the injection of the second type of color of plastic material if such ports and passages are not sealed off.

One prior art proposal to overcome this problem of the apparatus using separate injection passages involves employment of an operator who, in addition to the functions described above, is also required to apply patches over the second material ports in the face of the sole plate prior to initiating each cycle thereby preventing entry of the first material into the second material ports. This solution, however, proved in practice to be ineffective and somewhat impractical since the additional work load placed on the single operator necessarily increases the production time per shoe and also difficulties in the placement and retention of the patches in their desired location renders the process unreliable and has led to many difficulties involving machine shutdown and consequential loss of production time with attendant increases in production costs.

SUMMARY OF THE INVENTION

An object of the present invention is to produce molded plastic articles such as footwear or loose soles for footwear, preferably in two united components, by a method which avoids voids and inhomogeneities in the article and the necessity for the trimming of sprues and runners from the finished article.

The present invention when employed for two-component molding, avoids the use of expensive or complicated expedients for sealing the various supply channels not in use from the mold cavity.

In a first embodiment, the invention provides means for molding plastic articles including two mold halves which, when closed, define at least in part a mold cavity and a supply duct or runner for the cavity, in which at least one injection port leads from the runner into the cavity at a location other than the parting line of the mold halves. This configuration has the effect of automatically removing the injection port runner from the articles as the mold is subsequently opened.

Generally, there will be two such ports which extend to different sides of the parting line from the runner and the invention is particularly applicable to the production of footwear soles (usually attached by the molding process to an upper) where the molding compound is supplied by a runner communicating with the sole edge at the heel part, or with the extreme rear underside at the heel part of the sole. It is envisaged that the invention will be of particular value in the formation of the first component of a two-component sole, although it is of course valuable also for one-component soles.

In a second embodiment, the invention provides means for molding plastic articles including a mold port having a runner or duct feeding a mold cavity through one or more injection ports, with the duct having a blind end in which air may be trapped and the mold port also including an air venting duct of small dimensions communicating with the blind end so shaped that any injected material entering the venting duct will solidify to a sprue of such shape that it will be removed together with and attached to the sprue from the supply duct.

It is more particularly envisaged that the supply duct should be a longitudinal duct within a sole plate of a mold for forming soles for, or attached to, footwear, and it is especially envisaged that such a supply duct shall constitute the supply channel for the second or lower component of a two-component sole.

A preferred constructional form of such a device comprises a plug situated in the end of the supply duct and at a small annular clearance and including vent passages communicating with the atmosphere and the clearance. Such an arrangement provides a good heat transfer from the injection material entering the annular clearance, and hence a rapid solidification. Also, it gives a clearance sprue of such a form that it will remain attached to the main supply duct sprue when the latter is removed.

A subsidiary feature related to this aspect of the invention is to provide a taper or series of steps on the plug. A nominally uniform clearance would, in practice, not be quite uniform so that the annular sprue therewithin would extend further into the clearance where the gap was largest. This might lead to a breakage of the endmost portions of the thin annular sprue. The provision of a taper, or a stepped profile on the plug provides a shorter, better shaped, sprue in the clearance with such sprue being easily removable with the supply duct sprue.

In an important third embodiment, the invention relates specifically to a two-component molding process and preferably to a molding process for two-component soles for, or molded in conjunction with, footwear. It envisages means comprising a mold part (such as a sole plate) having a runner or supply duct which communicates with a mold cavity via one or more injection ports. It further envisages an internal configuration within the port such that the removal of the molded article breaks the solidified material at the internal surface of the mold part and removal of a sprue in the supply duct leaves a portion of the material as a temporary seal within the injection port.

It is generally, although not exclusively, envisaged in this embodiment of the invention that a particular configuration of the injection port inlet end will facilitate the retention and separation of a sealing plug in the injection port outlet end. It is stressed, however, that the injection port may be formed in any convenient fashion. For example, the outlet end may be a hole in the sole plate and the inlet end may be a separate inserted member containing shaped communicating channels lying between this hole and the supply duct. Alternatively, the outlet end and inlet end may both be formed in an inserted member. Alternatively, both the outlet and inlet ends may be formed in the sole plate per se. Yet again, an inserted member may include part of the supply duct as well. All these constructions are described in more detail below.

It will be appreciated how this embodiment of the invention is particularly valuable in the production of the lower sole component of a two-component sole. A known process injects a first component into a sole cavity in a mold, lowers the sole plate (or raises the rest of the mold) and injects through separate channels a second component into the newly formed cavity to unite with the solidified first component. Clearly, the two sets of injection ports involved must be separate (in practice the first is in the back of the heel, and the second set under the sole) and the set for the second component must be sealed from incursion of the first component. If the ports are of the nature described above, they will not only remove their enclosed solidified runners from the second (i.e., outermost) component, thus avoiding any trimming operation, but will also (in removal of the supply duct sprue) leave a piece of the solidified runner in the injection port outlet end as a seal against the next injection of the first component in a subsequent cycle.

In a further embodiment of the invention, the injection port assembly includes an injection port outlet and an injection port inlet end with a perforated plate lying therebetween, with the perforations allowing supply of the injection material but preventing the solidified material in the outlet end being removed with the sprue in the inlet end. More specifically, it is envisaged that in this embodiment, the injection port assembly will comprise an injection port outlet end tapered toward the molding surface, a removable insert beneath the outlet end, an injection port inlet end formed in the insert for communicating with the outlet end, and a perforated plate lying on the insert with the perforations extending between the inlet and outlet ends. As shown in the drawings and described in more detail hereinafter, the perforated plate is preferably of circular configuration and contains two perforations towards the center with the material of the plates left between the perforations being bent upwardly from the two perforations to form an upwardly open trough-shaped member.

The term "injection port" as used herein means the whole communicating space lying between the molding surface and a supply duct. The term "orifice" means the place where the port enters the molding surface. The "injection port outlet end" is that end volume of the injection port nearest the molding surface and the "injection port inlet end" is that volume of the port nearest the supply duct.

The invention will be further described with reference to the accompanying drawings, wherein:

BRIEF DESCRIPTION OF THE DRAWINGS

FIG. 4 is a view of the improved form of the mold used for forming such footwear according to the present invention, FIG. 5 is a section taken along line A—A of FIG. 4, the view looking in the direction of the arrows, FIG. 6 is an exploded view illustrating the mold parts of FIG. 5 in an open position, FIG. 7 is a detail view of an alternative method of runner porting to that of FIGS. 5 and 6, FIGS. 8 and 9 illustrate a transverse section on line B—B of FIG. 4 showing an inserted member which causes a temporary sealing plug to be formed in the injection ports, FIG. 10 is a view of the inserted member per se, in three sections and a plan view, FIG. 11 is a view of an alternative form of inserted member, in section.

DETAILED DESCRIPTION OF THE INVENTION

Figure 1:
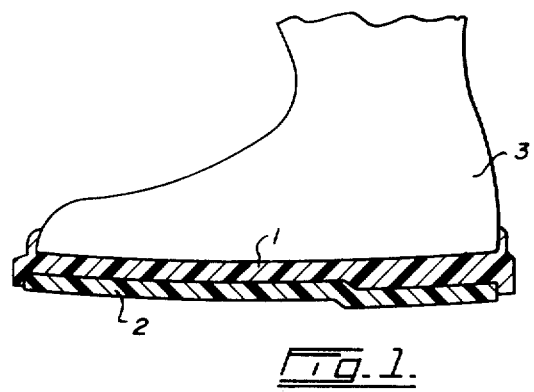
FIG. 1 is a longitudinal cross-section through footwear of the type to which this invention is primarily but not exclusively applicable.

The type of footwear to which the present invention is primarily but not exclusively applicable is shown in FIG. 1, and comprises a first sole member 1 of synthetic plastic material and a second sole member 2 of synthetic plastic material of different mechanical or chemical characteristics, and/or color, from the first sole member, with the sole members being attached to one another and to an upper 3 of suitable material.

Figure 2:
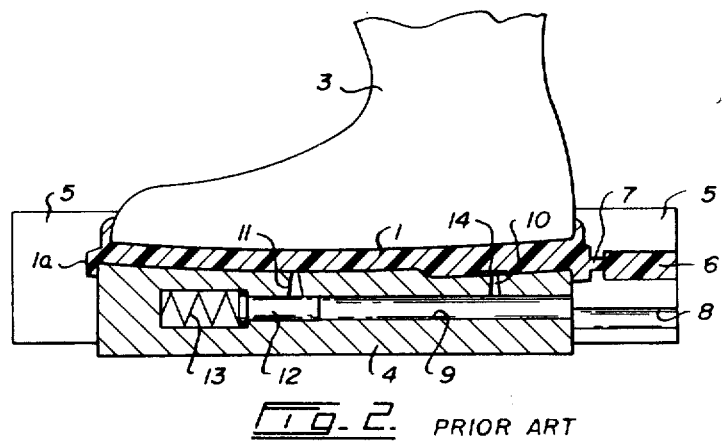
FIGS. 2 and 3 illustrate successive stages in forming a two-component sole on such footwear by a known method.
Figure 3:
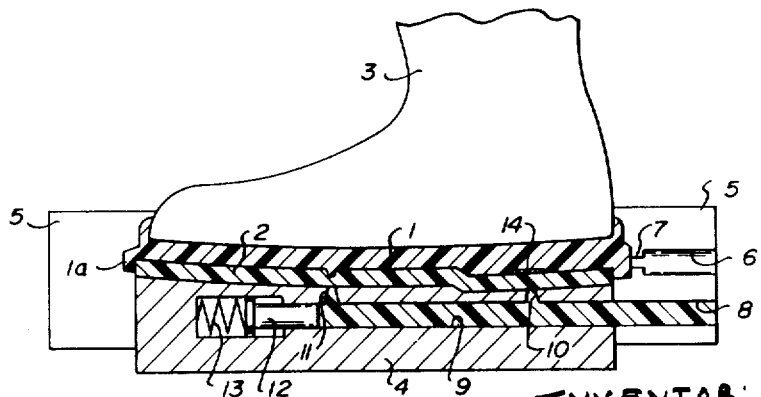

The footwear may be made in the two stages shown in FIGS. 2 and 3. The equipment used essentially comprises a sole plate 4 and a side mold 5. The side mold 5, which is in two halves parting approximately along the longitudinal center line of the footwear, and the sole plate 4 are relatively displaceable in the vertical direction. It is also known to provide a toe-cap mold part, but this is not shown separately.

In the prior art embodiment illustrated, the side mold parting line defines a sprue or runner duct 6 with a narrower injection port 7 for the injection compound of the sole member 1 and a sprue or runner duct 8 for the compound of the sole member 2. The sole plate 4 includes a runner duct 9 and communicating injection ports 10 and 11 extending from the duct to the molding surface through which the injected compound can pass to form the sole member 2. A sliding valve 12 biased by a spring 13 is provided to close the port 11 except during injection.

As will be apparent from FIGS. 2 and 3, a first compound is injected through the duct 6 and it is usual for the sole member 1 to have a downwardly extending rim 1a. Then, the sole plate 4 and side mold 5 are relatively displaced vertically until the ducts 8 and 9 coincide. A second compound is injected through the ducts 8 and 9 and ports 10 and 11 (i.e., displacing, by the injection pressure, the valve 12) to form sole member 2.

The disadvantages of this prior art procedure can also be seen from FIGS. 2 and 3. It is obviously necessary to block the ports 10 and 11 during the first stage. The valve 12 blocks the port 11 at the bottom, but a plug of the compound of the sole member 1 nevertheless forms in the upper part of the port. In practice, a temporary patch 14 is placed over the port (see, e.g., port 10). However, this introduces another operating step and increases expense.

In summary, therefore, these known means for blocking the ports are expensive due to the provision and positioning of patches, or inadequate due to a possible malfunction of the movable parts 12 and 13.

Another disadvantage which arises with the equipment disclosed in FIGS. 2 and 3 is that air may be trapped in the blind passage constituted by the duct 9. This air gives rise to bubbles and inhomogeneities in the second sole member. Yet another disadvantage is the need of a separate handling operation to remove the injection port runner formed in the injection port 7 when the mold halves are parted.

The above disadvantages are overcome by the means shown in combination in FIG. 4 and in its details in the subsequent figures.

In FIG. 4, the equipment is shown prior to the injection of the sole member 1. The upper 3, sole plate 4, side mold 5, ducts 6, 8 and 9 and ports 10 and 11 perform generally the same functions as before. However, there is provided an air venting arrangement defined by plug 15, vent hole 16 and venting clearance 17, communicating inserts 18 for the ports 10 and 11, and a special formation 19 of an injection port for the duct 6.

The air venting arrangement consists of the plug 15 in one end of the duct 9 at a small clearance 20 with the plug walls. For example, the clearance can be 0.005 inch. The plug also has an axial vent hole 21 which leads to the venting clearance 17 via the vent hole 16 and a plurality of communicating vent holes 22 between the central hole 21 and clearance 20.

When the melted compound of the sole member 2 enters the duct 9, it pushes therebefore the air in the duct and this air escapes through the clearance 20, holes 22, 21 and 16 and clearance 17. However, when the melted compound enters the clearance 20 it rapidly solidifies and does not reach the vent holes 22. Thus, when the runner in the duct 9 is pulled out at the end of a molding cycle, the thin solidified portion in the clearance 20 is pulled therewith, thereby leaving the vent clearance and holes operative for the next cycle.

It will be noted from FIG. 4 that the clearance need not be uniform. It is advantageous for the clearance to taper from a larger clearance on the supply duct end to a smaller clearance on the vent hole end. Alternatively, it can be discontinuously stepped. This improves the form of the clearance sprue and prevents small portions such as would block the air vent holes from being left behind.

The special formation 19 of the injection port for the duct 6 is shown in more detail in FIGS. 5 and 6 and a variant is shown in FIG. 7. Essentially, the injection port is split into two outlets 19a and 19b with one outlet being on either side of the parting line. When the mold halves 5a and 5b are separated (FIG. 6), the material in the outlets 19a and 19b will necessarily be removed from the sole member 1 without the necessity of a separate and expensive trimming step, and a sprue 6a will be separated from the molded sole.

FIG. 7 shows a variant of FIGS. 5 and 6 in which the duct 6 is split into two downwardly directed ports leading to the sole member 1 from below at the extreme back rim of the heel portion. Again, the runners are removed simply by opening the mold halves. With this embodiment, the back of the article of footwear is particularly free from undesirable marking.

The man skilled in the art will appreciate that while two outlets, one either side of the parting line, may be preferable, they are by no means essential. One outlet not located on the parting line would suffice to provide a molding method free from a separate sprue removal step.

The communicating inserts 18 (or, as described below, the port configurations) are of particular interest in the present invention. Such inserts are of a nature such that the removal of the sole from the mold separates the sole member 2 (i.e., the sole member injected through those ports) from any plug in the ports 10 and 11 to provide a sole free from such plugs, and also such that removal of a solidified sprue from duct 9 leaves a sealing plug in the outlet end of injection ports 10 and 11 in readiness for a subsequent injection of the compound of the sole member 1 in a following mold cycle.

The form of the insert shown in FIGS. 8–10 is that of a generally cylindrical plug inserted in a space below the outlet end of the port 10 (for example) and having two non-central longitudinal through holes 23, which are wider at their bottom portions, and a central conical recess 24 which communicates with each through hole as clearly illustrated in FIG. 9. The conical recess lies beneath the outlet end 25 and the intersection of the recess 24 and holes 23 defines a sharp cutting edges. The whole volume between the molding surface and the supply duct is herein referred to as the injection port.

As will be seen from FIG. 9, as the molded shoe is removed, a break will occur at point A, which is the weakest point in the solidified material, since the sole is still warm and is not as strong as the solidified injection port sprue. Subsequently, when the sprue in duct 9 is removed, the cutting edges defined between the conical recess 24 and holes 23 will ensure a separation of the plug at point B. It will be noted that the widening of the holes 23 at their lower portion makes the solidified material in the holes 23 stronger so that it does not break off as the sprue is removed. The holes can be smoothed off to ensure a good connection with the supply duct and although they are shown tapered this "smoothing off" gives a more "flared" configuration. The plug in the outlet end of the port remains in place for the next mold cycle as a sealing plug against incursion of the compound of the sole member 1 into the duct 9. It will, of course, be readily pushed out by the injection pressure at the next injection of compound for the sole member 2 and this feature is later more fully discussed.

While FIGS. 8–10 show the use of individual communicating inserts (placed in position through subsequently plugged hole 26 in the sole plate), it is possible to incorporate inserts which are integral with a portion of duct 9, as shown in FIG. 11. Such inserts can be held in place by a positioning screw 27.

Figure 12:
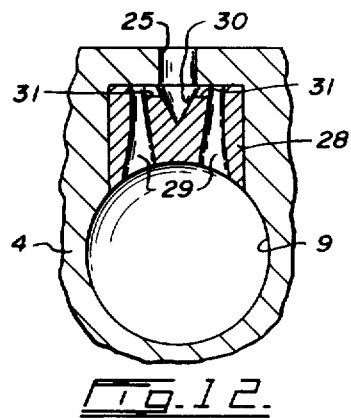
FIG. 12 is a view of a further variant of the inserted member of FIG. 10, FIGS. 13 and 14 are views in transverse sections through inserted members of a different internal configuration.

FIG. 12 illustrates communicating inserts 28 where, through holes 29 do not intersect conical recess 30, but communicate therewith via a slot 31. The insert is otherwise similar to that shown in FIGS. 8–10, and still works without the cutting edges shown in the earlier figures. Although two holes are shown, it is possible to use more or less holes.

Figure 13:
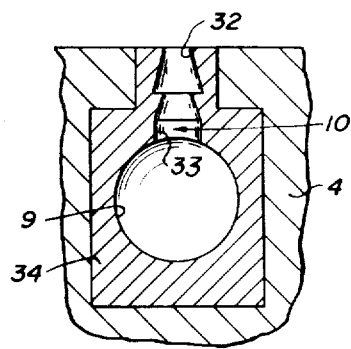

FIG. 13 shows an insert 34 where the port 10 is formed with an outlet end 32 which tapers upwardly and an inlet end 33 having an upwardly tapering portion. The same succession of separation of the solidified material is effected.

Figure 14:
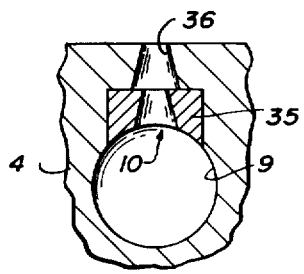

FIG. 14 discloses a port having the same configuration as that of FIG. 13 by virtue of a small inserted member 35. In this figure, outlet end 36 of the port is formed in the sole plate per se.

Figure 15:
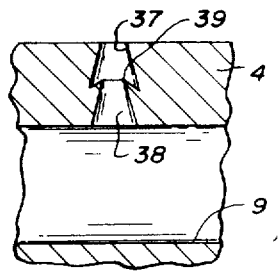
FIG. 15 is a view in transverse section through a port configuration generally shaped as the insert of FIGS. 13 and 14.

FIG. 15 illustrates the port with the outlet end denoted 37 and the inlet end 38. A sharp edge 39 therebetween assists in the separation. Although it is not shown in the drawings, it is possible to drill such ports, at least in part, from below, and plug the hole later if necessary.

Referring to FIGS. 13–15 above discussed, it will be seen from the drawings that there is an inwardly projecting ring surface between the two stacked tapering portions. Moreover, it will be seen that tapering portions are frusto-conical in shape.

Figure 16:
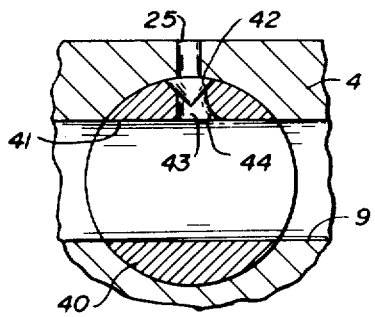
FIG. 16 is a view of a further form of insert which can be positioned through a bore in the side of a sole plate.

FIG. 16 shows an entirely different form of insert defined by a cylindrical member 40 with a diametral bore 41 constituting part of the supply duct 9, and lying beneath the outlet end 25 of the injection port which is formed in the sole plate. The cylindrical member is provided with a conical recess 42 and an inlet end 43 for the injection port. The inlet end is smoothed off at 44 for ensuring that the injection port inlet end sprue remains attached to the supply duct sprue.

Figure 17:
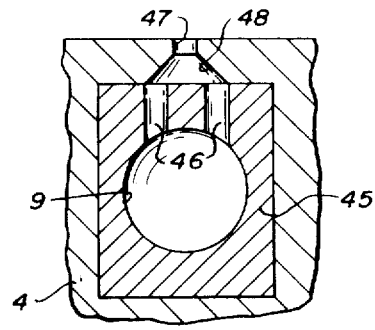
FIGS. 17, 18 and 19 are views in transverse sections through further, related forms of insert and port configuration.
Figure 18:
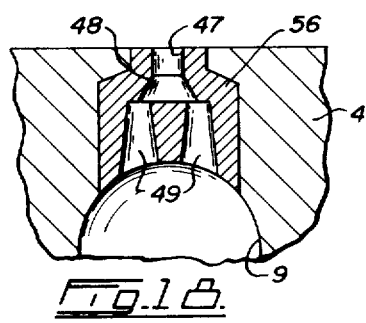
Figure 19:
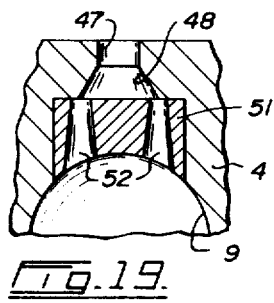

In FIG. 17 there is disclosed an inserted member 45 provided with parallel bores 46 beneath an outlet end 47 formed with a conical recess 48 (exaggerated for illustrative purposes). FIG. 18 is similar except that bore 49 are tapered and the inserted member 50 extends to the surface and does not contain any part of the duct 9. FIG. 19 is again similar but with still a smaller inserted portion 51 which contains bores 52.

Figure 20:
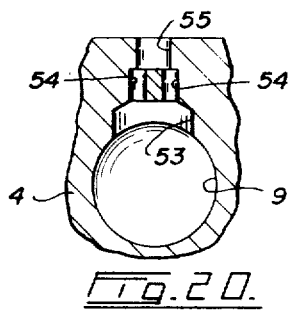
FIGS. 20, 21 and 22 are views in transverse sections of yet further related inserts and port configurations.
Figure 21:
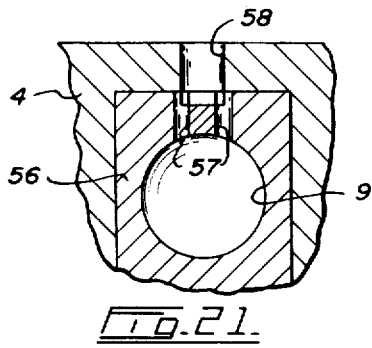
Figure 22:
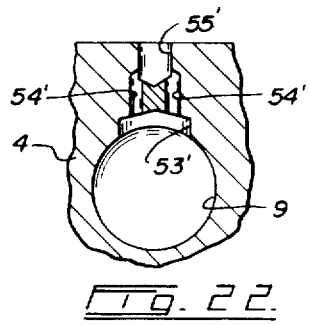

FIG. 20 illustrates the duct 9 communicating with the molding surface by bores 53, bores 54 (being four bores in parallel) and an outlet end bore 55. In FIG. 21, an insert 56 provided with bore 57 which communicate with outlet bore 58 serves the same purpose. FIG. 22 is similar to FIG. 20 but with a modified shape of bores 53', 54' and 55'. Such bores can be drilled from below (53' and 54') through a hole subsequently plugged (not shown) and above (55').

Figure 23:
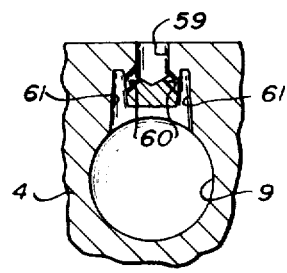
FIG. 23 is a view of a variant port configuration in transverse section.

FIG. 23 shows an outlet end bore 59, communicating angled bores 60 (two or more), further bores 61 and the supply duct 9.

In general, the straight-sided outlet ends to the injection ports are preferable, if larger soles, using more than one injection port, are being made. If there is a too much taper on the side wall of the plug in the outlet end, the pressure will build up until one plug is blown out in a subsequent cycle. Thereafter, all of the molding component will enter by the unblocked port. However, single-port ducts are adequate for small shoes such as childrens' shoes since a tapered side wall is no disadvantage, and helps in the sprue separation at the molding surface when the shoe is removed.

It will be appreciated how the build-up of pressure needed to dislodge a plug from a tapered port outlet end in itself leads to problems with air bubbles; hence the venting plug described above.

Figure 24:
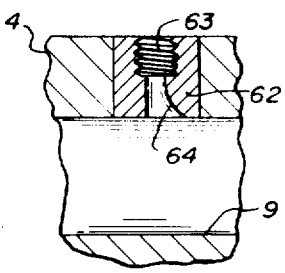
FIG. 24 is a view in longitudinal section of a different form of insert.

FIG. 24 shows yet another inserted member 62 which includes the whole injection port. Outlet end 63 is threaded, with the threads shaped to provide an adequate grip in a downwardly pulling direction and suitable release upwardly in a subsequent molding cycle. Inlet end 64 is again smoothed into the supply duct 9.

Figure 25:
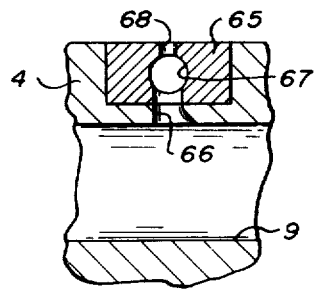
FIGS. 25 and 26 are views in longitudinal section and elevation of a yet further form of insert.
Figure 26:
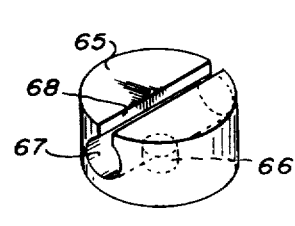

FIGS. 25 and 26 show another embodiment in which a communicating insert 65 is formed with a bore 66, diametral bore 67 and a slot 63. The same functions are carried out as above described.

Figure 27:
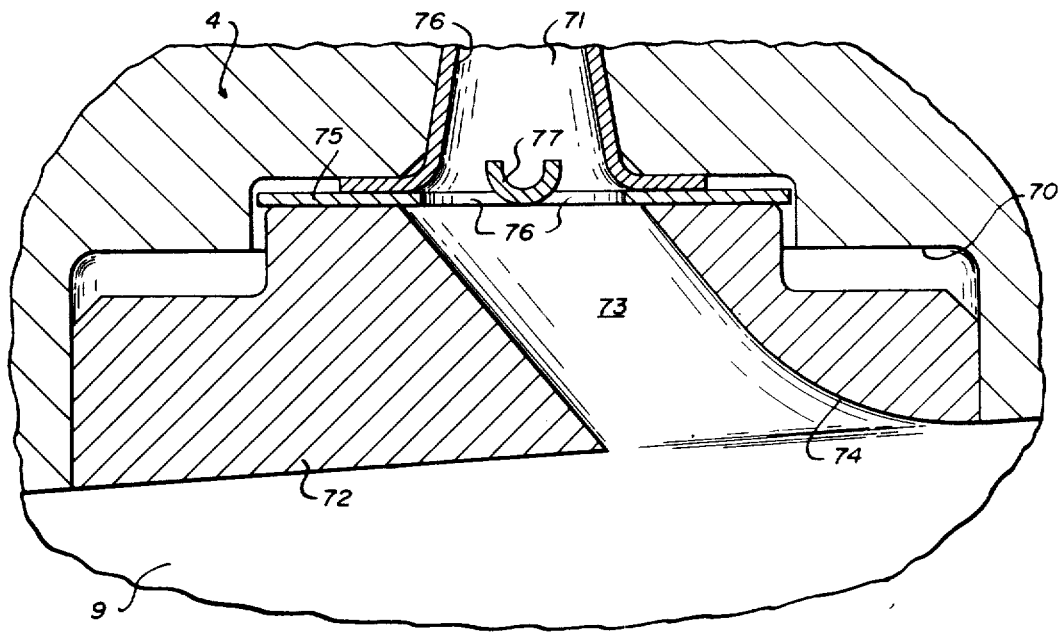
FIG. 27 is a view in cross-section through an alternative injection port assembly configuration.
Figure 28:
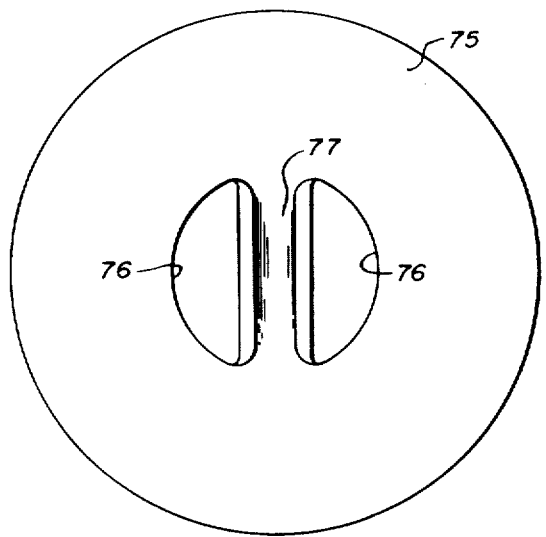
FIG. 28 is a view of a component of the assembly of FIG. 27.

In the embodiment shown in FIGS. 27 and 28, the sole plate 4 of the mold machine includes the longitudinal runner or supply duct 9 and a cavity 70 of stepped decreasing dimensions from the duct 9 to injection port orifices 71 which are formed in the sole plate.

Within the cavity 70 is located an assembly including an inserted member 72 containing an angled bore 73 which is smoothed off at 74, a circular plate 75 hereinabove described in more detail, and a generally conical liner 76. The injection port therefore includes an outlet end within the conical liner 76 and above the plate 75, and an inlet end essentially constituted by the angled bore 73.

The circular plate 75 is shown in FIG. 28 and includes perforations 76 and an upstanding trough-shaped portion 77 formed by bending upwardly the material of the perforations. While the trough 77 is shown as extending at right angles to the longitudinal direction of the duct 9, this is mainly for clarity of illustration. It is preferable for the trough 77 to lie longitudinally in relation to the sole plate 4.

According to this embodiment, the procedure is to inject the compound of the sole member 1 through the spearate injection system comprising the duct 6 and port 7 after adequate solidification to lower the sole plate in relation to the side mold parts, and thereafter inject the second compound through duct 9 and one or more injection ports as described in FIGS. 27 and 28 into the new cavity between the sole plate and the first compound to form the sole member 2. As will be appreciated, the perforations in the circular plate 75 with the upstanding trough portion 77 allow the injection of the second compound through the port, but after solidification of the second compound prevent the solidified material in the outlet end of the injection port assembly being removed with the sprue in the inlet end when the runner in duct 9 is pulled out at the end of a molding cycle.

Various modifications may be made within the scope of the invention as set forth in the appended claims, and the embodiments shown in the drawings should only be taken as examples of the invention. For example, the method and means of the invention is as applicable to the production of loose soles as it is to the production of soles already united to the upper, although those features relating to the side mold halves are not generally relevant in such context. Also the features shown in FIGS. 5–7, or the venting arrangement shown in FIG. 4 are as useful in the production of one-component soles as in the production of two-component soles.

Indeed, all the features shown have a general applicability to molding practice and need not be confined to the production of footwear.

What I claim is:

1. An apparatus for molding plastic articles including a mold part having a supply duct formed therein and at least one injection port leading from said supply duct to a mold cavity, said mold part further being provided with an air venting duct of small dimensions connected between said supply duct and the atmosphere, said venting duct being sized so that any material to be injected through said at least one injection port which enters said venting duct will solidify, by virtue of the rapid contact cooling, to a sprue of such shape that it can be removed together with and attached to a supply duct sprue, said air venting duct of small dimensions being constituted by an annular clearance between the supply duct and a plug in the supply duct, with said plug having vent holes between said clearance and atmosphere.

2. The apparatus as claimed in claim 1 in which said mold part is the sole plate of a mold for forming molded footwear soles either loose or attached to an upper, and said supply duct extends longitudinally within said sole plate.

3. An apparatus for molding two-component footwear soles either loose or attached during the molding to an upper comprising, two side mold halves and a sole plate defining at least in part a mold cavity, means mounting said side mold halves and said sole plate for relative vertical displacement, said side mold halves having recesses which define a supply duct for said cavity along a parting line of said side mold halves, said sole plate being provided with a supply duct extending longitudinally therein and having at least one injection port leading from said supply duct to the mold cavity, and said sole plate further having an air venting duct of small dimensions located between said supply duct and the atmosphere, said venting duct being sized so that any material to be injected through said at least one injection port which enters said venting duct will solidify, by virtue of the rapid contact-cooling, to a sprue of such shape that it can be removed together with and attached to a supply duct sprue, said air venting duct of small dimensions being constituted by an annular clearance between the supply duct and a plug in the supply duct, with said plug having vent holes between said clearance and atmosphere.

4. The apparatus as claimed in claim 1 in which said annular clearance is tapered inwards.

5. The apparatus as claimed in claim 1 in which said annular clearance is stepped inwards.

6. An apparatus for molding two-component plastic articles, comprising, at least two mold parts defining at least in part a mold cavity, means mounting said mold parts for relative movement to define mold cavities of different size, means defining a first supply duct to the smaller of said mold cavities, one of said mold parts having therein a separate, second supply duct extending to the larger of said mold cavities, means defining at least one injection port having an outlet end and an inlet end, said injection port connecting said second supply duct to said larger cavity, and within said injection port shaped to hold a solidified injection port sprue whereby said sprue breaks at the mold internal surface as a molded article is removed from said surface, and to retain at least a part of said injection port sprue within an outlet end of the injection port as a sealing plug when a solidified second supply duct sprue is removed, and said communicating means being a perforated plate lying between the outlet end and the inlet end, with the perforations allowing supply of injection material but preventing the solidified material in the outlet end being removed if the sprue in the inlet end.

7. An apparatus for molding footwear, soles, either as loose soles or attached to an upper comprising, two side mold halves and a sole plate defining at least in part a mold cavity, means mounting said side mold halves and said sole plate for relative vertical displacement, means defining a supply duct for said mold cavity to supply a first molding component, said sole plate having a longitudinal supply duct and at least one injection port having an outlet end and inlet end, said injection port connecting said sole plate supply duct with said mold cavity to supply a second molding component, and communicating means within said injection port shaped to hold a solidified injection port sprue whereby said sprue breaks at the mold internal surface as a molded sole is removed from said surface and to retain at least a part of said injection port sprue within an outlet end of the injection port as a sealing plug when a solidified supply duct sprue is removed, and said communicating means being a perforated plate lying between the outlet end and the inlet end, with the perforations allowing supply of injection material but preventing the solidified material at the outlet end being removed with the sprue in the inlet end.

8. The apparatus as claimed in claim 6 in which said communicating means is defined by a conical recess with its apex downwards beneath the outlet end of the injection port and two cylindrical channels parallel to the axis of and intersecting said recess to define edges, and outwardly flared ends for said channels at the ends thereof remote from the conical recess.

9. The apparatus as claimed in claim 6 in which said communicating means includes a metallic member inserted between the supply duct and the outlet end of the injection port, said member having a conical recess with its apex downwards beneath the injection port, two cylindrical channels parallel to the axis of and intersecting said recess to define edges, and outwardly flared ends for said channels at the ends thereof remote from the conical recess.

10. The apparatus as claimed in claim 6 in which said communicating means includes a metallic member constituting a part of the supply duct and having a portion located below the outlet end of the injection port, said portion having a conical recess with its apex downwards beneath the outlet end of the injection port, two cylindrical channels parallel to the axis of and intersecting said recess to define edges, and outwardly flared ends for said channels at the ends thereof remote from the conical recess.

11. The apparatus as claimed in claim 6 in which said communicating means includes an obstruction extending across said outlet end of said injection port to prevent a plug in said outlet being removed downwardly, and at least one communicating channel past said obstruction to said supply duct.

12. An apparatus for molding two-component plastic articles, comprising, at least two mold parts defining at least in part a mold cavity, means mounting said mold parts for relative movement to define mold cavities of different size, means defining a first supply duct to the smaller of said mold cavities, one of said mold parts having therein a separate, second supply duct extending to the larger of said mold cavities, means defining at least one injection port connecting said second supply duct to said larger cavity, and communication means within said injection port to hold a solidified injection port sprue whereby said sprue breaks at the mold internal surface as a molded article is removed from said surface, and to retain at least a part of said injection port sprue within an outlet end of the injection port as a sealing plug when a solidified second supply duct sprue is removed, the injection port being defined by two similar and successive frustoconical portions with each portion converging upwardly, with the upper portion constituting the outlet end with its smaller end constituting an outlet orifice and the lower portion joining the upper to provide an inwardly projecting ring surface and constituting a communicating channel to the second supply duct.

13. The apparatus as claimed in claim 7 in which the injection port is defined by an outlet end bored in the sole plate, and a transverse cylindrical member extends within the sole plate, said member having a first diametral hole to constitute a continuation of the supply duct and a second, radial hole as a communicating channel between said diametral hole and said outlet end, and said cylindrical member having a conical recess where the outlet end of the injection port meets said radial hole.

14. The apparatus as claimed in claim 6 in which the injection port is provided with an outlet end with parallel walls, a frusto-conical portion below said outlet end, with its smaller end upwards, and at least one channel not in alignment with said outlet end connecting the base of said frusto-conical portion with the supply duct.

15. The apparatus as claimed in claim 6 in which the injection port is provided with an outlet end with parallel walls, at least one channel not in alignment with the outlet end connecting the outlet end with the supply duct.

16. The apparatus as claimed in claim 6 in which the injection port is provided with an internally threaded outlet end, and a channel of smaller diameter than that of the outlet end connecting said outlet end with the supply duct.

17. The apparatus as claimed in claim 6 in which the injection port is provided with a slot on the molding face, a cylindrical hole beneath, parallel to, and communicating with said slot along its length, and a channel connecting said cylindrical hole with said supply duct.

18. An apparatus for molding two-component plastic articles, comprising, at least two mold parts defining at least in part a mold cavity, means mounting said mold parts for relative movement to define mold cavities of different size, means defining a first supply duct to the smaller of said mold cavities, one of said mold parts having therein a separate, second supply duct extending to the larger of said mold cavities, means defining at least one injection port connecting said second supply duct to said larger cavity, and communication means within said injection port to hold a solidified injection port sprue whereby said sprue breaks at the mold internal surface as a molded article is removed from said surface, and to retain at least a part of said injection port sprue within an outlet end of the injection port as a sealing plug when a solidified second supply duct sprue is removed, said injection port being defined by two similar and successive frustoconical portions with each portion converging upwardly, with the upper portion constituting the outlet end with its smaller end constituting an outlet orifice and the lower portion joining the upper to provide an inwardly projecting ring surface and constituting a communicating channel to the second supply duct and at least said lower similar and successive frustoconical portion is in an insert.

19. The apparatus as claimed in claim 8 wherein said insert contains said lower and upper frustoconical portions and said second supply duct.

20. An apparatus for molding two-component plastic articles, comprising, at least two mold parts defining at least in part a mold cavity, means mounting said mold parts for relative movement to define mold cavities of different size, means defining a first supply duct to the smaller of said mold cavities, one of said mold parts having therein a separate, second supply duct extending to the larger of said mold cavities, means defining at least one injection port connecting said second supply duct to said larger cavity, and communication means within said injection port to hold a solidified injection port sprue whereby said sprue breaks at the mold internal surface as a molded article is removed from said surface, and to retain at least a part of said injection port sprue within an outlet end of the injection port as a sealing plug when a solidified second supply duct sprue is removed, said injection port being defined by two similar and successive frustoconical portions with each portion converging upwardly, with the upper portion constituting the outlet end with its smaller end constituting an outlet orifice and the lower portion joining the upper to provide an inwardly projecting ring surface and constituting a communicating channel to the second supply duct and said inwardly projecting ring surface being inclined from a line normal to the axis of said upper and lower frustoconical portions toward said second supply duct.

* * * * *